United States Patent
Wu et al.

(10) Patent No.: US 9,955,473 B2
(45) Date of Patent: *Apr. 24, 2018

(54) METHOD FOR PROCESSING PHYSICAL DOWNLINK CONTROL CHANNEL DATA, TRANSMITTING END, AND USER EQUIPMENT

(71) Applicant: Huawei Technologies Co., Ltd., Shenzhen (CN)

(72) Inventors: Yuchun Wu, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,514

(22) Filed: Dec. 20, 2016

(65) Prior Publication Data

US 2017/0105202 A1    Apr. 13, 2017

Related U.S. Application Data

(63) Continuation of application No. 14/316,226, which is a continuation of application No. (Continued)

(30) Foreign Application Priority Data

Dec. 26, 2011 (CN) .......................... 2011 1 0441964
Feb. 24, 2012 (CN) .......................... 2012 1 0044256

(51) Int. Cl.
H04W 4/00       (2009.01)
H04W 72/04      (2009.01)
(Continued)

(52) U.S. Cl.
CPC ........ H04W 72/042 (2013.01); H04B 7/0413 (2013.01); H04J 13/10 (2013.01)

(58) Field of Classification Search
USPC ....... 370/329, 242, 252, 255, 328, 330, 338, 370/339, 483
See application file for complete search history.

(56) References Cited

U.S. PATENT DOCUMENTS 8,537,862 B2 *   9/2013   Blankenship ......... H04L 1/0004
                                                        370/252
9,042,319 B2 *   5/2015   Papasakellariou .... H04L 1/1854
                                                        370/329
(Continued)

FOREIGN PATENT DOCUMENTS

CN    101816156 A    8/2010
CN    102246449 A    11/2011

OTHER PUBLICATIONS

U.S. Appl. No. 15/365,694, claim 1, filed Nov. 30, 2016, p. 24.*
(Continued)

*Primary Examiner* — Phuongchau Ba Nguyen
(74) *Attorney, Agent, or Firm* — Leydig, Voit & Mayer, Ltd.

(57) ABSTRACT

A method for processing physical downlink control channel data, a transmitting end, and a user equipment are provided and relate to the field of communications, which can extract a scrambling sequence in multiple modulation modes, so that scrambling and descrambling are performed on physical downlink control channel data in multiple modulation modes. The method includes: generating a scrambling sequence corresponding to a control channel element according to an index number of the control channel element and/or a modulation mode used by the control channel element; performing scrambling on physical downlink control channel data by using the scrambling sequence; and
(Continued)

sending the scrambled physical downlink control channel data to a user equipment. The embodiments of the present application are used to perform scrambling and descrambling on physical downlink control channel data.

11 Claims, 14 Drawing Sheets

Related U.S. Application Data

PCT/CN2012/085923, filed on Dec. 5, 2012, now Pat. No. 9,544,889.

(51) Int. Cl.
*H04B 7/0413* (2017.01)
*H04J 13/10* (2011.01)

(56) References Cited

U.S. PATENT DOCUMENTS

| | | | |
|---|---|---|---|
| 9,544,889 B2* | 1/2017 | Wu | H04L 5/0053 |
| 2009/0136034 A1 | 5/2009 | Gaal et al. | |
| 2011/0077038 A1 | 3/2011 | Montojo et al. | |
| 2011/0222501 A1 | 9/2011 | Kim et al. | |
| 2011/0255631 A1 | 10/2011 | Pi | |
| 2011/0283171 A1 | 11/2011 | Siew et al. | |
| 2013/0003663 A1* | 1/2013 | Blankenship | H04L 5/0053 370/329 |
| 2014/0321383 A1* | 10/2014 | Wu | H04L 5/0053 370/329 |
| 2014/0348092 A1 | 11/2014 | Ihm et al. | |

OTHER PUBLICATIONS

U.S. Appl. No. 14/316,226, filed Jun. 26, 2014.
U.S. Appl. No. 15/365,694, filed Nov. 30, 2016.
"UE and CCE specific scrambling codes for low complexity blind detection of downlink control signaling," 3GPP TSG RAN WG1 #49bis meeting, Orlando, U.S., R1-072916, $3^{rd}$ Generation Partnership Project, Valbonne, France (Jun. 25-29, 2007).
"UE specific PDCCH scrambling," 3GPP TSG RAN WG1 #51bis meeting, Sevilla, Spain R1-080406, $3^{rd}$ Generation Partnership Project, Valbonne, France (Jan. 14-18, 2008).
"CCE Scrambling for Reliable PDCCH Location Detection," 3GPP TSG RAN1 #51bis, Sevilla, Spain, R1-080568, (R1-080094), $3^{rd}$ Generation Partnership Project, Valbonne, France (Jan. 14-18, 2008).
"$3^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.3.0, pp. 1-103, $3^{rd}$ Generation Partnership Project, Valbonne, France (Sep. 2011).
"$3^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.4.0, pp. 1-101, $3^{rd}$ Generation Partnership Project, Valbonne, France (Dec. 2011).

* cited by examiner

METHOD FOR PROCESSING PHYSICAL DOWNLINK CONTROL CHANNEL DATA, TRANSMITTING END, AND USER EQUIPMENT

CROSS-REFERENCE TO RELATED APPLICATIONS

This application is a continuation of U.S. application Ser. No. 14/316,226, filed on Jun. 26, 2014, which is a continuation of International Patent Application No. PCT/CN2012/085923, filed on Dec. 5, 2012, which claims priority to Chinese Patent Application No. 201110441964.6, filed on Dec. 26, 2011, and Chinese Patent Application No. 201210044256.3, filed on Feb. 24, 2012, all of which are incorporated herein by reference in their entireties.

TECHNICAL FIELD

The present application relates to the field of communications, and in particular, to a method for processing physical downlink control channel data, a transmitting end, and a user equipment.

BACKGROUND

An LTE (long term evolution) project is an evolution of 3G and is a transition between 3G technology and 4G technology. The LTE is a global 3.9G standard, which improves and enhances an air access technology of 3G. In addition, the LTE improves performance of cell edge users, increases a cell capacity, and reduces a system delay, and employs an OFDM (orthogonal frequency division multiplexing) and an MIMO (multiple input multiple output). The LTE is a unique standard for radio network evolution of the LTE.

During transmission of downlink service data of the LTE, multiple UEs (User Equipment, user terminal, briefly referred to as user) in one cell multiplextime frequency resources dynamically, where time frequency resources occupied by each UE are controlled by a PDCCH (physical downlink control channel) corresponding to the UE. When a transmitting end transmits a control signal to UEs, the transmitting end needs to perform scrambling on PDCCHs of the UEs.

In the prior art, in LTE Rel-10 and earlier releases, scrambling sequences used to perform scrambling on PDCCHs of UEs are extracted from a long sequence. Specifically, each PDCCH includes at least one CCE (control channel element), where a data length of each CCE is 36 REs (resource element); because a modulation mode of the PDDCH in LTE Rel-10 and earlier releases is a QPSK (quadrature phase shift keying), in which each RE is 2 bits, a scrambling sequence that needs to be extracted by each CCE is 72 bits long; because scrambling sequences that need to be extracted by all CCEs are in the same length, an start position of a corresponding scrambling sequence that needs to be extracted by a current CCE can be determined by merely knowing how many CCEs have already extracted a scrambling sequence.

In LTE Rel-11, because CoMP (coordinated multi-point), MU-MIMO (multiple user-multiple input multiple output) enhancement and the like are considered, the PDCCH capacity becomes a bottleneck to the increase of system throughput. Therefore, further enhancement of the PDCCH capacity is considered in the 3GPP (the 3rd Generation Partnership Project). A newly added PDCCH channel is called an ePDCCH (enhanced physical downlink control channel), and each ePDCCH includes at least one eCCE (enhanced control channel element). In LTE Rel-11, the modulation mode of the ePDCCH is no longer only the QPSK, and may further be a 16QAM modulation and a 64QAM modulation. In this way, a data length of each eCCE in the ePDCCH is no longer fixed, and therefore the length of a scrambling sequence that needs to be extracted is no longer always 72 bits. When a $k^{th}$ eCCE in the ePDCCH uses the QPSK modulation mode, the length of a scrambling sequence that needs to be extracted by the $k^{th}$ eCCE is $2 \times N_{eCCE_k}^{RE}$ bits; when the $k^{th}$ eCCE uses the 16QAM (quadrature amplitude modulation), the length of the scrambling sequence is $4 \times N_{eCCE_k}^{RE}$ bits; when the $k^{th}$ eCCE uses the 64QAM, the length of the scrambling sequence is $6 \times N_{eCCE_k}^{RE}$ bits. In this case, an start position of a corresponding scrambling sequence that needs to be extracted by a current eCCE cannot be computed by merely knowing how many eCCEs have extracted a scrambling sequence, which results in that the current eCCE cannot extract a scrambling sequence. In this way, scrambling and descrambling cannot be performed on the ePDCCH in multiple modulation modes.

SUMMARY

Embodiments of the present application provide a method for processing physical downlink control channel data, a transmitting end, and a user equipment, which can extract a scrambling sequence in multiple modulation modes, so that scrambling and descrambling are performed on physical downlink control channel data in multiple modulation modes.

To achieve the foregoing objective, the embodiments of the present application use the following technical solution:

In one aspect, an embodiment of the present application provides a method for processing physical downlink control channel data, including:
  generating a scrambling sequence corresponding to a control channel element according to an index number of the control channel element and/or a modulation mode used by the control channel element;
  performing scrambling on physical downlink control channel data by using the scrambling sequence; and
  sending the scrambled physical downlink control channel data to a user equipment.

In one aspect, an embodiment of the present application provides another method for processing physical downlink control channel data, including:
  generating a scrambling sequence corresponding to a control channel element according to an index number of the control channel element and/or a modulation mode used by the control channel element;
  receiving scrambled physical downlink control channel data from a transmitting end; and
  performing descrambling on the physical downlink control channel data by using the scrambling sequence.

In another aspect, an embodiment of the present application provides a transmitting end, including:
  a first scrambling sequence generating unit, configured to generate a scrambling sequence corresponding to a control channel element according to an index number of the control channel element and/or a modulation mode used by the control channel element;
  a scrambling unit, configured to perform scrambling on physical downlink control channel data by using the scrambling sequence; and a transmitting unit, configured to send the scrambled physical downlink control channel data to a user equipment.

In another aspect, an embodiment of the present application provides a user equipment, including:
- a second scrambling sequence generating unit, configured to generate a scrambling sequence corresponding to a control channel element according to an index number of the control channel element and/or a modulation mode used by the control channel element;
- a receiving unit, configured to receive scrambled physical downlink control channel data from a transmitting end; and
- a descrambling unit, configured to perform descrambling on the physical downlink control channel data by using the scrambling sequence.

In the method for processing physical downlink control channel data, the transmitting end, and the user equipment provided by the embodiments of the present application, by generating a scrambling sequence according to an index number of a control channel element and/or a modulation mode used by the control channel element, a scrambling sequence in multiple modulation modes is extracted, so that scrambling and descrambling are performed on physical downlink control channel data in multiple modulation modes.

BRIEF DESCRIPTION OF DRAWINGS

To illustrate the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Embodiment 1

Figure 1:
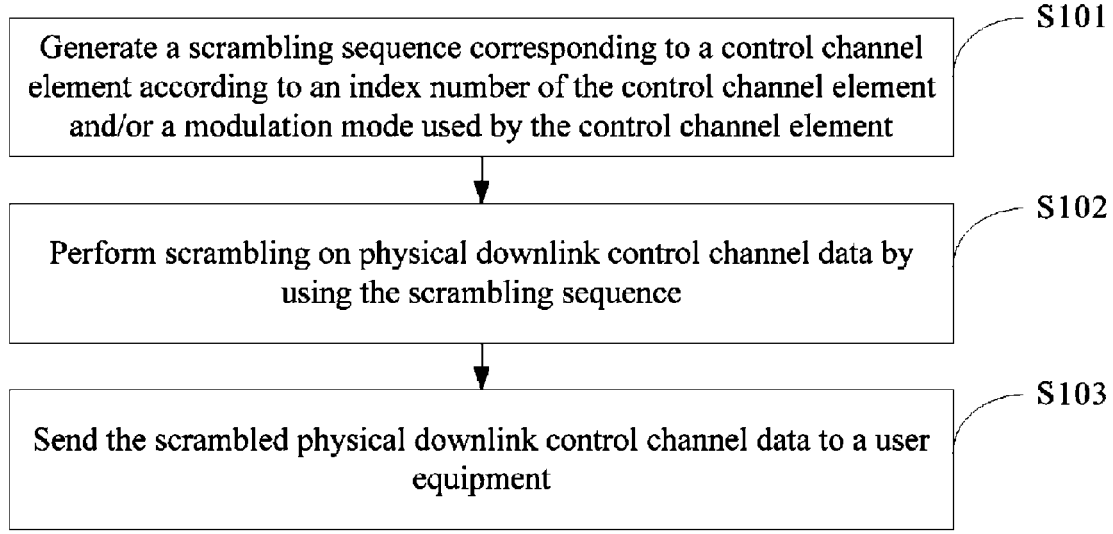
FIG. 1 is a first schematic diagram of a method for processing physical downlink control channel data according to an embodiment of the present application.

A method for processing physical downlink control channel data provided by an embodiment of the present application is based on a transmitting end side. As shown in FIG. 1, the method includes the following steps:

S101. Generate a scrambling sequence corresponding to a control channel element according to an index number of the control channel element and/or a modulation mode used by the control channel element.

S102. Perform scrambling on physical downlink control channel data by using the scrambling sequence.

S103. Send the scrambled physical downlink control channel data to a user equipment.

Figure 2:
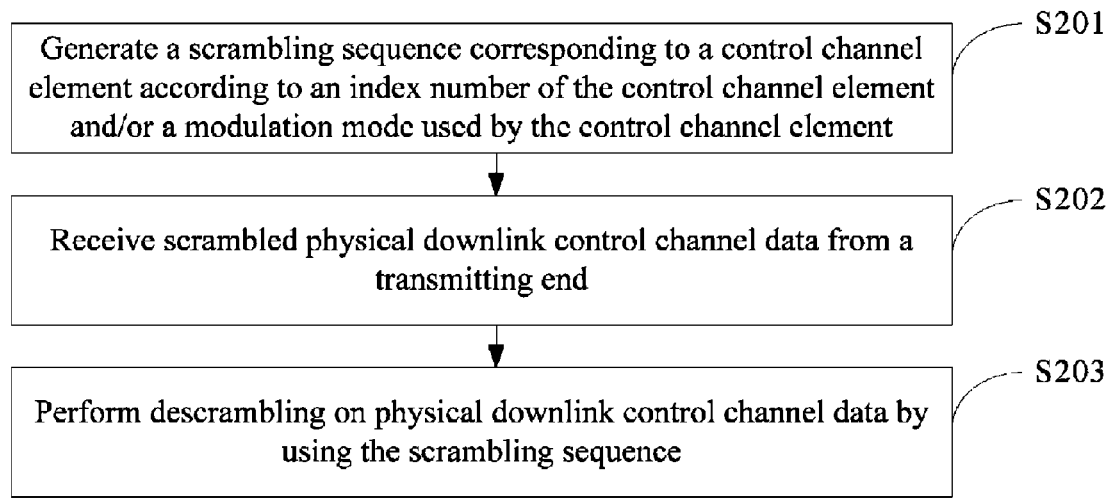
FIG. 2 is a second schematic diagram of a method for processing physical downlink control channel data according to an embodiment of the present application.

In another aspect, another method for processing physical downlink control channel data is further provided, and the method is based on a user equipment side. As shown in FIG. 2, the method includes the following steps:

S201. Generate a scrambling sequence corresponding to a control channel element according to an index number of the control channel element and/or a modulation mode used by the control channel element.

S202. Receive scrambled physical downlink control channel data from a transmitting end.

S2032. Perform descrambling on physical downlink control channel data by using the scrambling sequence.

The physical downlink control channel may be an ePDCCH and the control channel element may be an eCCE.

In the method for processing physical downlink control channel data provided by the embodiment of the present application, by generating a scrambling sequence according to an index number of a control channel element and/or a modulation mode used by the control channel element, a scrambling sequence in multiple modulation modes is extracted, so that scrambling and descrambling are performed on physical downlink control channel data in multiple modulation modes.

Embodiment 2

Figure 3:
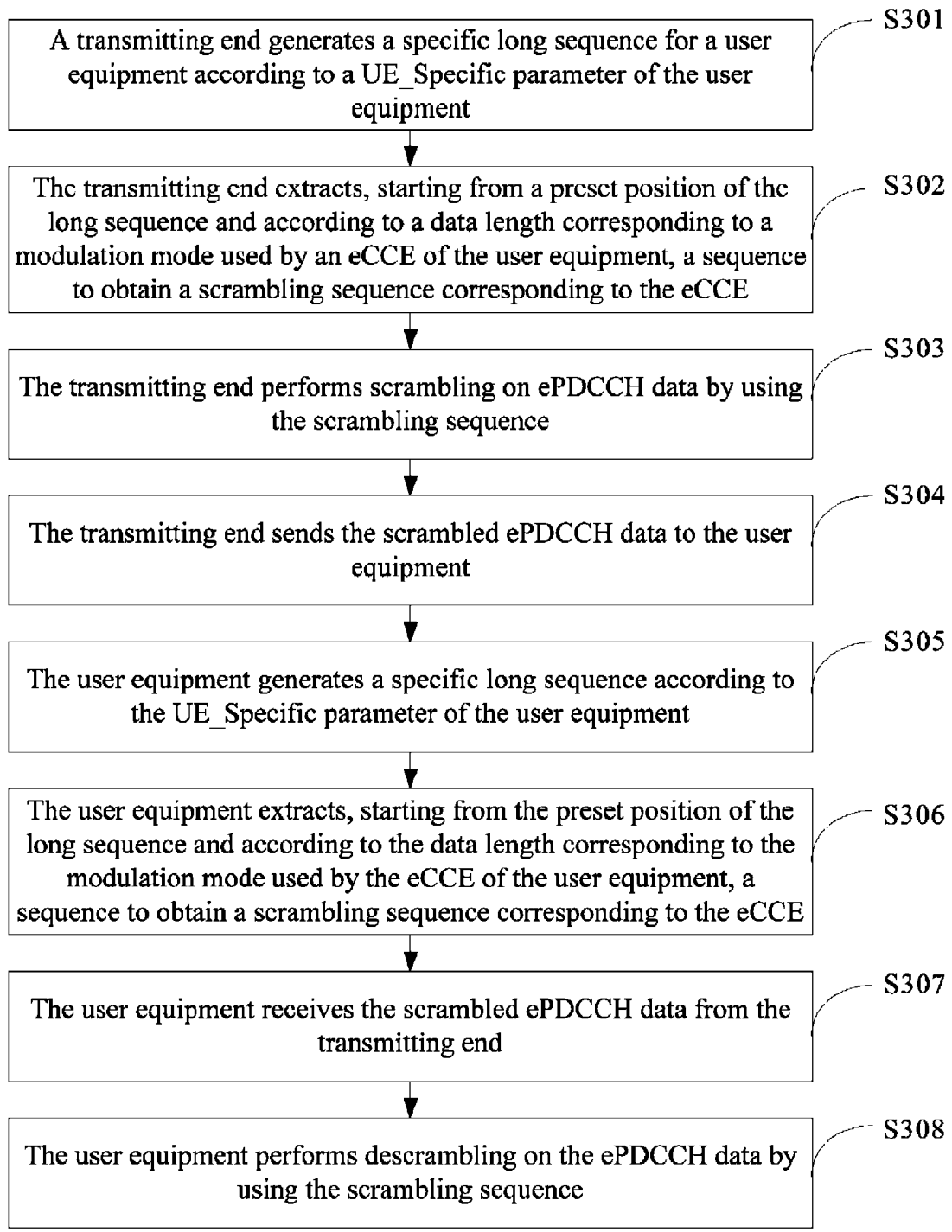
FIG. 3 is a third schematic diagram of a method for processing physical downlink control channel data according to an embodiment of the present application.

As shown in FIG. 3, a method for processing physical downlink control channel data provided by an embodiment of the present application includes the following steps:

S301. A transmitting end generates a specific long sequence for a user equipment according to a UE_Specific parameter of the user equipment.

Specifically, there are multiple users in one cell; generally, ePDCCHs of all the users are located in one subframe; before a base station performs scrambling on the ePDCCHs of these users, the base station generates a specific long sequence for each user by using a specific seed of each user, where the seed is a parameter set to compute an initial value of the long sequence and the seed of each user includes a UE_Specific parameter of the user.

Using one user as an example, the seed $C_{init}$ used to generate a long sequence for the user is as follows: $c_{init} = UE_{RNTI} \times 2^{15} + n_{subframe} \times 2^8 + 3200$, where $UE_{RNTI}$ represents the UE_Specific parameter of the user, $n_{subframe}$ represents a parameter of a subframe index number, and a long sequence obtained according to the seed $C_{init}$ is $\{c(0), c(0), c(2), c(3), L\}$.

S302. The transmitting end extracts, starting from a preset position of the long sequence and according to a data length corresponding to a modulation mode used by an eCCE of the user equipment, a sequence to obtain a scrambling sequence corresponding to the eCCE.

Exemplarily, it is assumed that a current base station has n eCCEs, that is, $eCCE_0$ to $eCCE_{n-1}$, with the index numbers from 0 to n−1. In general cases, the number of eCCEs (that is, the number of eCCEs in an ePDCCH of a user) allocated to one user equipment is 1, 2, 4 or 8 and the index numbers of the eCCEs are successive. Assuming that the ePDCCH of the user includes two eCCEs, that is, $eCCE_0$ and $eCCE_1$, and the modulation mode of the user equipment is a QPSK, $eCCE_0$ and $eCCE_1$ also use the QPSK modulation, and the number of REs in $eCCE_0$ is $N_{CCE_0}^{RE}$ and the number of REs in $eCCE_1$ is $N_{CCE_1}^{RE}$. Because each RE in the QPSK is 2 bits long, the length of a sequence that needs to be extracted by $eCCE_0$ is $2N_{CCE_0}^{RE}$ bits and the length of a sequence that needs to be extracted by $eCCE_1$ is $2N_{CCE_1}^{RE}$ bits. The eCCEs extract a sequence according to an ascending order of the index numbers of the eCCEs, that is, $eCCE_0$ extracts a sequence firstly, followed by $eCCE_1$. Definitely, because the user equipment can identify modulation modes of all eCCEs in the ePDDCH of the user equipment, $eCCE_0$ and $eCCE_1$ may also use different modulation modes.

When $eCCE_0$ and $eCCE_1$ of the user equipment extract a scrambling sequence from the specific long sequence $C(0), C(1), C(2), C(3), L$ of the user equipment, the preset position is generally $C(0)$. Therefore, a corresponding scrambling sequence extracted by $eCCE_0$ is $\{C(0), C(1), L\ C(2N_{eCCE_0}^{RE}-1)\}$ and a corresponding scrambling sequence extracted by $eCCE_1$ is $\{c(2N_{eCCE_0}^{RE}), c(2N_{eCCE_0}^{RE}+1), L\ c(2(N_{eCCI_0}^{RE}+N_{eCCE_1}^{RE})-1)\}$.

S303. The transmitting end performs scrambling on ePDCCH data by using the scrambling sequence.

S304. The transmitting end sends the scrambled ePDCCH data to the user equipment.

S305. The user equipment generates a specific long sequence according to the UE_Specific parameter of the user equipment. The UE_Specific parameter is always the same for each user at the transmitting end or on the user equipment. Therefore, the long sequence generated by the user equipment is completely the same as the long sequence generated by the transmitting end for the user, and the method for generating the long sequence by the user equipment is completely the same as step S301, which is not further described.

S306. The user equipment extracts, starting from the preset position of the long sequence and according to the data length corresponding to the modulation mode used by the eCCE of the user equipment, a sequence to obtain a scrambling sequence corresponding to the eCCE. After the user equipment generates the long sequence, the method for extracting a corresponding scrambling sequence by $eCCE_0$ and $eCCE_1$ of the user equipment is completely the same as step S302, which is not further described.

S307. The user equipment receives the scrambled ePDCCH data from the transmitting end.

S308. The user equipment performs descrambling on the ePDCCH data by using the scrambling sequence.

In particular, when data is received and sent by using an MIMO technology, besides the modulation mode of the eCCE, a transmission mode of the MIMO must be considered. Generally, the MIMO includes two transmission modes: a double stream transmission mode and a transmit diversity mode.

Assuming that the modulation mode of the eCCE is still the QPSK, when the transmit diversity mode is used, the data length of each RE of the eCCE is 2 bits and the length of a sequence that needs to be extracted by the eCCE is $2N_{CCD_1}^{RE}$ bits. However, when the double stream transmission mode is used, the data length of each RE of the eCCE is changed to 4 bits and the length of a sequence that needs to be extracted by the eCCE is $4N_{CCD_1}^{RE}$ bits. The method for extracting the sequence by the eCCE is completely the same as step S302, which is not further described.

It should be noted that in general cases, the 16QAM modulation and the double stream transmission mode are not used concurrently, that is, when the modulation mode of the eCCE is the 16QAM modulation, the eCCE does not use the double stream transmission mode of the MIMO technology to receive and send data; or, when the eCCE uses the double stream transmission mode of the MIMO technology to receive and send data, the eCCE does not use the 16QAM modulation.

Figure 4:
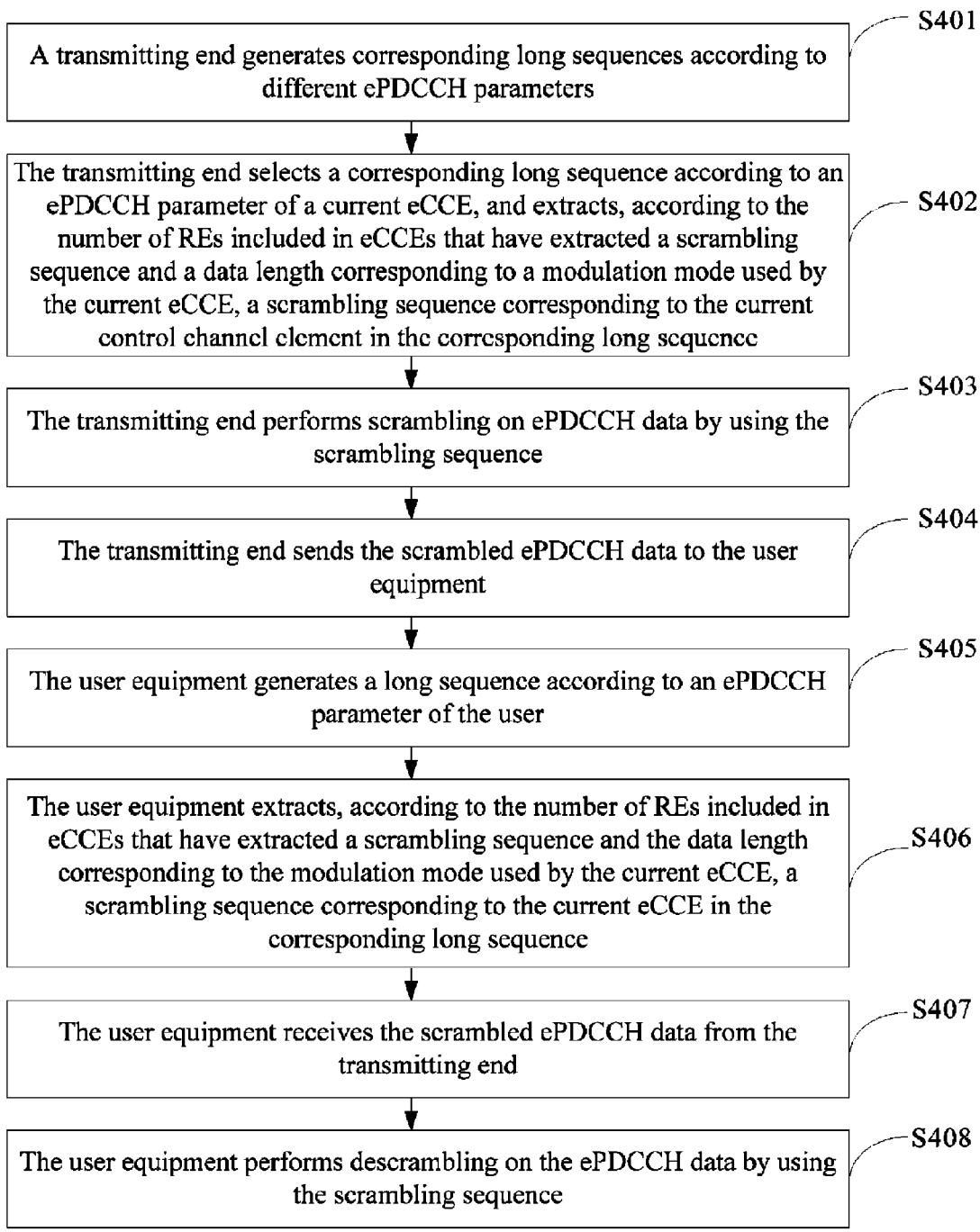
FIG. 4 is a fourth schematic diagram of a method for processing physical downlink control channel data according to an embodiment of the present application.

As shown in FIG. 4, another method for processing physical downlink control channel data provided by the embodiment of the present application includes the following steps:

S401. A transmitting end generates corresponding long sequences according to different ePDCCH parameters.

Specifically, before performing scrambling on a control signal, the transmitting end generates long sequences by using seeds corresponding to different modulation modes, where the seeds include ePDCCH parameters corresponding to different modulation modes.

Exemplarily, assuming that there are three modulation modes, QPSK, 16QAM, and 64QAM, the seeds corresponding to the three modulation modes are $C_{init\_QPSK}$, $C_{init\_QAM}$, and $C_{init\_64QAM}$ respectively, and long sequences generated according to these seeds are $c^v_{QPSK} = \{c_{QPSK}(0), c_{QPSK}(1), L\}$, $c^\omega_{16QAM} = \{c_{16QAM}(0), c_{16QAM}(1), \Lambda\}$, and $c^\omega_{64QAM} = \{c_{64QAM}(0), c_{64QAM}(1), \Lambda\}$ respectively.

S402. The transmitting end selects a corresponding long sequence according to an ePDCCH parameter of a current eCCE, and extracts, according to the number of REs included in eCCEs that have extracted a scrambling sequence and a data length corresponding to a modulation mode used by the current eCCE, a scrambling sequence corresponding to the current control channel element in the corresponding long sequence.

Exemplarily, assuming that a $k^{th}$ eCCE of the transmitting end, that is, $eCCE_k$, uses the 16QAM modulation mode, the number of REs ($N^{RE}_{eCCE_0}+N^{RE}_{eCCE_1}+\Lambda \ N^{RE}_{eCCE_{k-1}}$) included in $eCCE_0$ to $eCCE_{k-1}$ is multiplied by the number of bits of each RE corresponding to the modulation mode of $eCCE_k$. Because each RE in the 16QAM modulation mode is 4 bits long, $eCCE_0$ to $eCCE_{k-1}$ have extracted a total of $4(N^{RE}_{eCCE_0}+N^{RE}_{eCCE_1}+L \ N^{RE}_{eCCE_{k-1}})$ bits from c(0) to c(4($N^{RE}_{eCCE_0}+N^{RE}_{eCCE_1}+L \ N^{RE}_{eCCE_{k-1}}$)−1). Therefore, an start position of the scrambling sequence corresponding to the current eCCE is c(4($N^{RE}_{eCCE_0}+N^{RE}_{eCCE_1}+L \ N^{RE}_{eCCE_k}$)), where the modulation modes of $eCCE_0$ to $eCCE_{k-1}$ may be the QPSK, the 16QAM, or the 64QAM.

In the foregoing method, $eCCE_k$ assumes that $eCCE_0$ to $eCCE_{k-1}$ that have extracted a scrambling sequence use the same modulation mode as $eCCE_k$. For example, if $eCCE_k$ uses the 16QAM modulation mode, $eCCE_k$ always assumes that $eCCE_0$ to $eCCE_{k-1}$ also use the 16QAM modulation mode no matter what modulation modes are actually used by $eCCE_0$ to $eCCE_{k-1}$.

The transmitting end extracts, starting from the start position, a sequence according to the data length $4N^{RE}_{eCCE_k}$ bits of the current $eCCE_k$ to obtain a scrambling sequence corresponding to the current $eCCE_k$.

S403. The transmitting end performs scrambling on ePDCCH data by using the scrambling sequence.

S404. The transmitting end sends the scrambled ePDCCH data to a user equipment.

S405. The user equipment generates a long sequence according to an ePDCCH parameter of the user.

Specifically, the user selects, according to the modulation mode of the user, a seed used to generate a long sequence, where the seed includes an ePDCCH parameter corresponding to the modulation mode of the user. The long sequence generated by the user equipment according to the ePDCCH parameter of the user is completely the same as the long sequence generated by the transmitting end according to the ePDCCH parameter. The method for generating the long sequence by the user equipment is completely the same as step S401, which is not further described.

S406. The user equipment extracts, according to the number of REs included in eCCEs that have extracted a scrambling sequence and the data length corresponding to the modulation mode used by the current eCCE, a scrambling sequence corresponding to the current eCCE in the corresponding long sequence. The method for extracting the scrambling sequence by the user equipment is completely the same as step S402, which is not further described.

S407. The user equipment receives the scrambled ePDCCH data from the transmitting end.

S408. The user equipment performs descrambling on the ePDCCH data by using the scrambling sequence.

In particular, when data is received and sent by using an MIMO technology, besides the modulation mode of the eCCE, a transmission mode of the MIMO must be considered. Generally, the MIMO includes two transmission modes: a double stream transmission mode and a transmit diversity mode.

Assuming that the modulation mode of the eCCE is the QPSK, when the transmit diversity mode is used, the data length of each RE of the eCCE is 2 bits and the length of a sequence that needs to be extracted by the eCCE is $2N^{RE}_{CCE_1}$ bits. However, when the double stream transmission mode is used, the data length of each RE of the eCCE is changed to 4 bits and the length of a sequence that needs to be extracted by the eCCE is $4N^{RE}_{CCE_1}$ bits. The method for extracting the sequence by the eCCE is completely the same as step S402, which is not further described.

It should be noted that in general cases, the 16QAM modulation and the double stream transmission mode are not used concurrently, that is, when the modulation mode of the eCCE is the 16QAM modulation, the eCCE does not use the double stream transmission mode of the MIMO technology to receive and send data; or, when the eCCE uses the double stream transmission mode of the MIMO technology to receive and send data, the eCCE does not use the 16QAM modulation.

Figure 5:
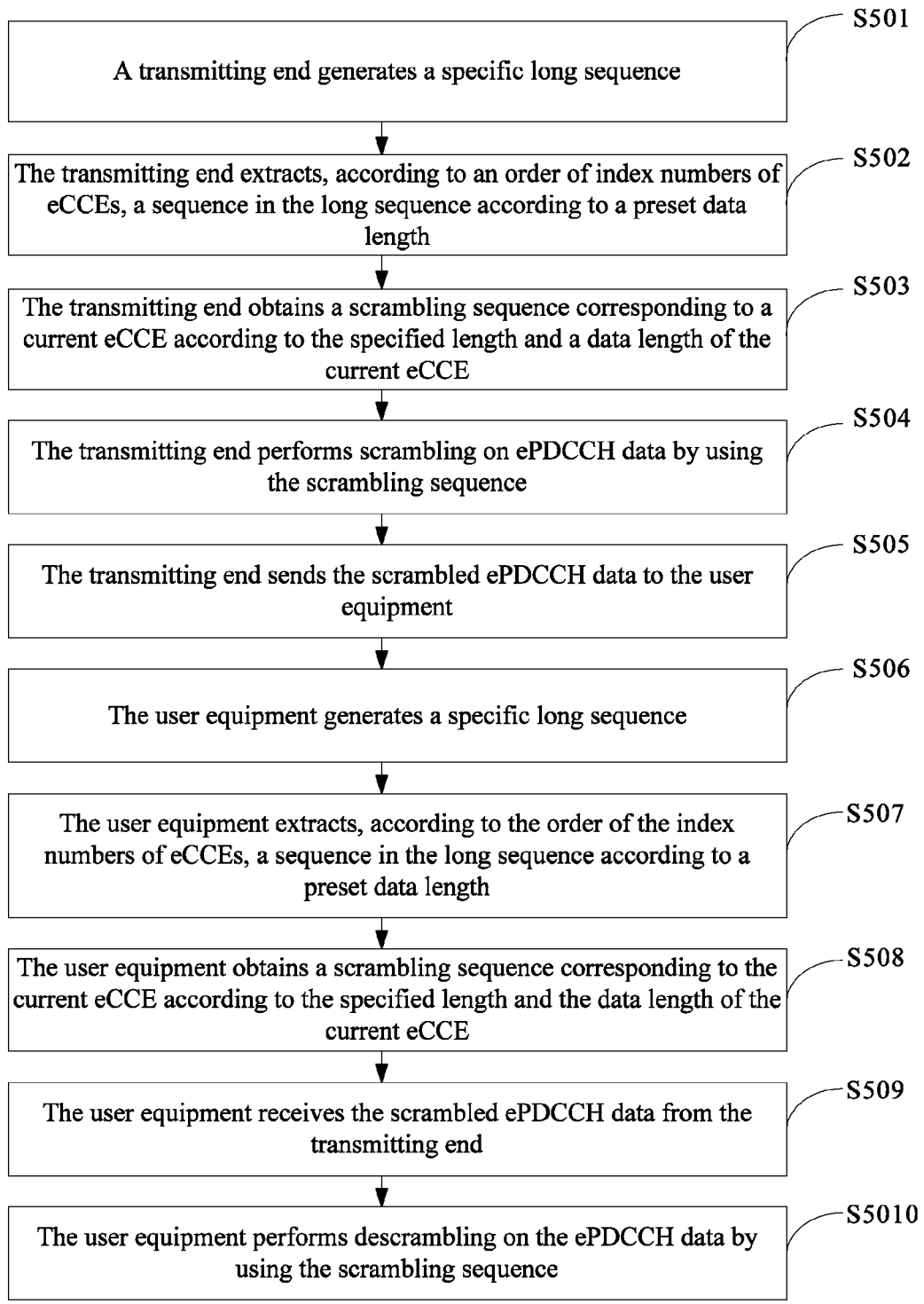
FIG. 5 is a fifth schematic diagram of a method for processing physical downlink control channel data according to an embodiment of the present application.

The embodiment of the present application further provides another method for processing physical downlink control channel data. As shown in FIG. 5, the method includes the following steps:

S501. A transmitting end generates a specific long sequence.

Specifically, a long sequence {c(0),c(1),c(2),c(3),L} is generated according to a specific seed $c_{init}=n_{subframe} \times 2^9 + N^{CELL}_{ID}$, where $n_{subframe}$ represents a parameter of a subframe index number and $N^{CELL}_{ID}$ represents a parameter of a cell index number.

S502. The transmitting end extracts, according to an order of index numbers of eCCEs, a sequence in the long sequence according to a preset data length.

Specifically, after the long sequence {c(0),c(1),c(2),c(3), L} is obtained, each eCCE extracts a sequence in the long sequence according to a specified length, for example, it is specified that lengths of sequences extracted by each eCCE are equal. Exemplarily, using $eCCE_k$ as an example, a sequence {c(F), c(F+1),Λ c(F+G−1)} is extracted in the long sequence, where F represents a starting point of the sequence and G represents a length of the sequence, which means that the specified length is G.

S503. The transmitting end obtains a scrambling sequence corresponding to a current eCCE according to the specified length and a data length of the current eCCE.

Specifically, after extracting the sequence, $eCCE_k$ compares the length G of the obtained sequence {c(F),c(F+1),Λ c(F+G−1)} with a data length of $eCCE_k$; when the length G of the sequence is smaller than the data length of $eCCE_k$, the sequence {c(F),c(F+1),Λ c(F+G−1)} is replicated until a length of the sequence replicated multiple times is equal to the data length of $eCCE_k$, and a sequence obtained at this time is the scrambling sequence corresponding to $eCCE_k$. Exemplarily, for $eCCE_k$, the scrambling sequence extracted from the long sequence is {c(F),c(F+1),Λ c(F+71)}, with the length of 72 bits. Assuming that the modulation mode of $eCCE_k$ is 16QAM, the length of the scrambling sequence corresponding to $eCCE_k$ should be 144 bits. Therefore, $eCCE_k$ needs to replicate the sequence {c(0),c(1),L c(71)} until a length of the sequence is 144 bits. Therefore, the obtained scrambling sequence corresponding to $eCCE_k$ is {c(F),c(F+1),Λ c(F+71), c(F),c(F+1),Λ c(F+71)}.

When the length G of the sequence is greater than or equal to the data length of $eCCE_k$, $eCCE_k$ extracts, in the sequence {c(F),c(F+1),Λ c(F+G−1)}, a part with a length equal to the data length of $eCCE_k$. At this time, the obtained sequence is the scrambling sequence corresponding to $eCCE_k$. Exemplarily, for example, the sequence extracted by $eCCE_k$ from the long sequence is $\{c(F),c(F+1),\Lambda\ c(F+215)\}$, with the length of 216 bits. Assuming that the modulation mode of $eCCE_k$ is the QPSK, the length of the scrambling sequence corresponding to $eCCE_k$ is 72 bits. Therefore, $eCCE_k$ only needs to extract a sequence with a length of 72 bits in the sequence $\{c(F),c(F+1),\Lambda\ c(F+215)\}$, for example, $eCCE_k$ may extract $\{c(F),c(F+1),\Lambda\ c(F+71)\}$, as the scrambling sequence.

S504. The transmitting end performs scrambling on ePDCCH data by using the scrambling sequence.

S505. The transmitting end sends the scrambled ePDCCH data to a user equipment.

S506. The user equipment generates a specific long sequence, where the long sequence generated by the user equipment is completely the same as the long sequence generated by the transmitting end. The method for generating the specific long sequence by the user equipment is completely the same as step S501, which is not further described.

S507. The user equipment extracts, according to the order of the index numbers of the eCCEs, a sequence in the long sequence according to the preset data length. The method for extracting the sequence by the user equipment is completely the same as step S502, which is not further described.

S508. The user equipment obtains a scrambling sequence corresponding to the current eCCE according to the specified length and the data length of the current eCCE. The method for obtaining the scrambling sequence by the user equipment is completely the same as step S503, which is not further described.

In particular, when data is received and sent by using an MIMO technology, besides the modulation mode of the eCCE, a transmission mode of the MIMO must be considered. Generally, the MIMO includes two transmission modes: a double stream transmission mode and a transmit diversity mode.

Assuming that the modulation mode of the eCCE is the QPSK, when the transmit diversity mode is used, the data length of each RE of the eCCE is 2 bits and the length of a sequence that needs to be extracted by the eCCE is $2N_{CCE_1}^{Re}$ bits. However, when the double stream transmission mode is used, the data length of each RE of the eCCE is changed to 4 bits and the length of a sequence that needs to be extracted by the eCCE is $4N_{CCE_1}^{Re}$ bits. The method for extracting the sequence by the eCCE is completely the same as step S502, which is not further described.

It should be noted that in general cases, the 16QAM modulation and the double stream transmission mode are not used concurrently, that is, when the modulation mode of the eCCE is the 16QAM modulation, the eCCE does not use the double stream transmission mode of the MIMO technology to receive and send data; or, when the eCCE uses the double stream transmission mode of the MIMO technology to receive and send data, the eCCE does not use the 16QAM modulation.

S509. The user equipment receives the scrambled ePDCCH data from the transmitting end.

S5010. The user equipment performs descrambling on the ePDCCH data by using the scrambling sequence.

In this embodiment, the transmitting end may be a base station and the user equipment may be a handset.

In the method for processing physical downlink control channel data provided by the embodiment of the present application, by generating a scrambling sequence according to an index number of a control channel element and/or a modulation mode used by the control channel element and a transmission mode of an MIMO, a scrambling sequence in multiple modulation modes is extracted, so that scrambling and descrambling are performed on physical downlink control channel data in multiple modulation modes.

Embodiment 3

Figure 6:
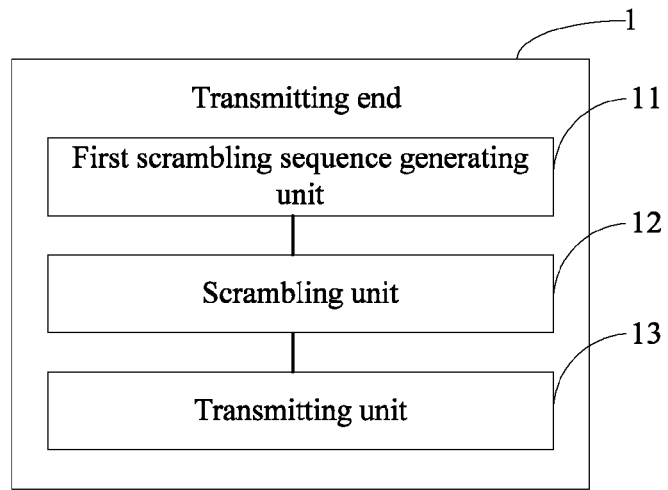
FIG. 6 is a first schematic structural diagram of a transmitting end according to an embodiment of the present application.

As shown in FIG. 6, a transmitting end 1 provided by an embodiment of the present application includes:

a first scrambling sequence generating unit 11, configured to generate a scrambling sequence corresponding to a control channel element according to an index number of the control channel element and/or a modulation mode used by the control channel element;

a scrambling unit 12, configured to perform scrambling on physical downlink control channel data by using the scrambling sequence; and a transmitting unit 13, configured to send the scrambled physical downlink control channel data to a user equipment.

Figure 7:
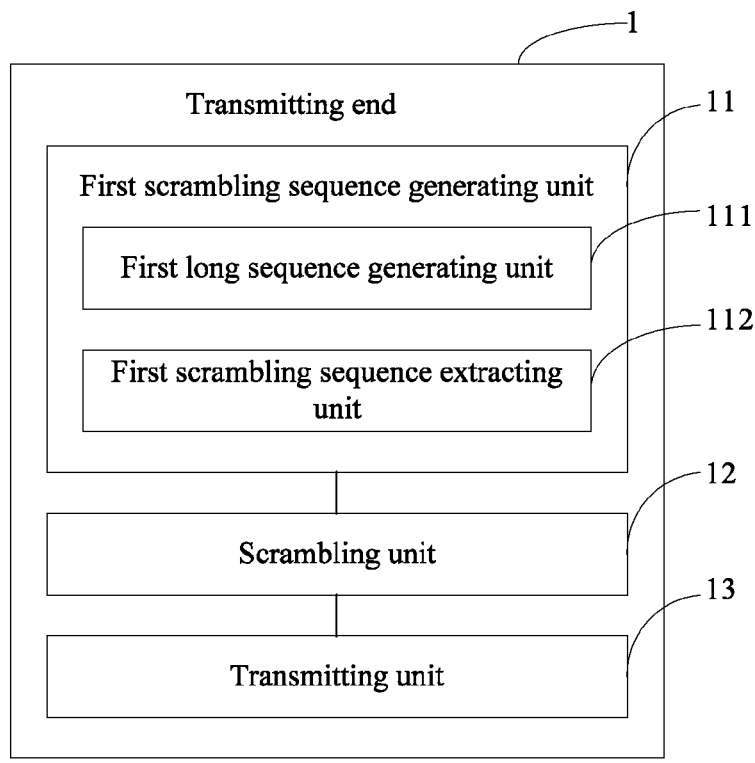
FIG. 7 is a second schematic structural diagram of a transmitting end according to an embodiment of the present application.

Further, as shown in FIG. 7, the first scrambling sequence generating unit 11 may include:

a first long sequence generating unit 111, configured to generate a specific long sequence for the user equipment according to a specific parameter of the user equipment; and a first scrambling sequence extracting unit 112, configured to extract, according to a data length corresponding to the modulation mode used by the control channel element of the user equipment, a scrambling sequence corresponding to the control channel element in the specific long sequence.

When data is received and sent by using an MIMO, the first scrambling sequence extracting unit 112 is further configured to extract, according to a data length corresponding to the modulation mode used by the control channel element of the user equipment and a transmission mode of the MIMO, a scrambling sequence corresponding to the control channel element in the specific long sequence.

Figure 8:
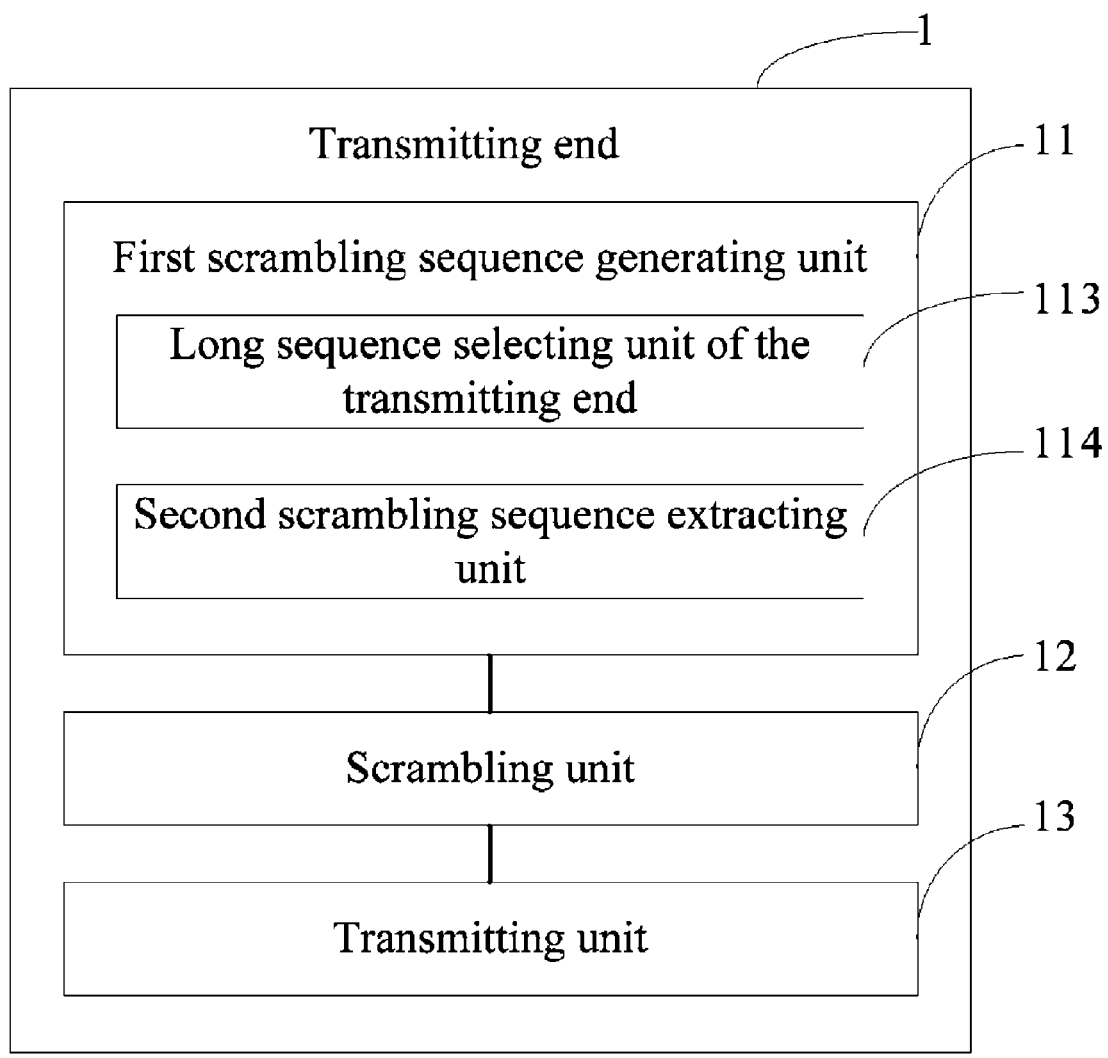
FIG. 8 is a third schematic structural diagram of a transmitting end according to an embodiment of the present application.

Or, as shown in FIG. 8, the first scrambling sequence generating unit 11 may include:

a long sequence selecting unit 113 of the transmitting end, configured to select a long sequence in a long sequence set according to physical downlink control channel parameters of the control channel element; and a second scrambling sequence extracting unit 114, configured to extract, according to a data length corresponding to the modulation mode used by the control channel element, a scrambling sequence corresponding to the control channel element in the selected long sequence.

When data is received and sent by using an MIMO, the second scrambling sequence extracting unit 114 is further configured to extract, according to a data length corresponding to the modulation mode used by the control channel element and a transmission mode of the MIMO, a scrambling sequence corresponding to the control channel element in the selected long sequence.

Figure 9:
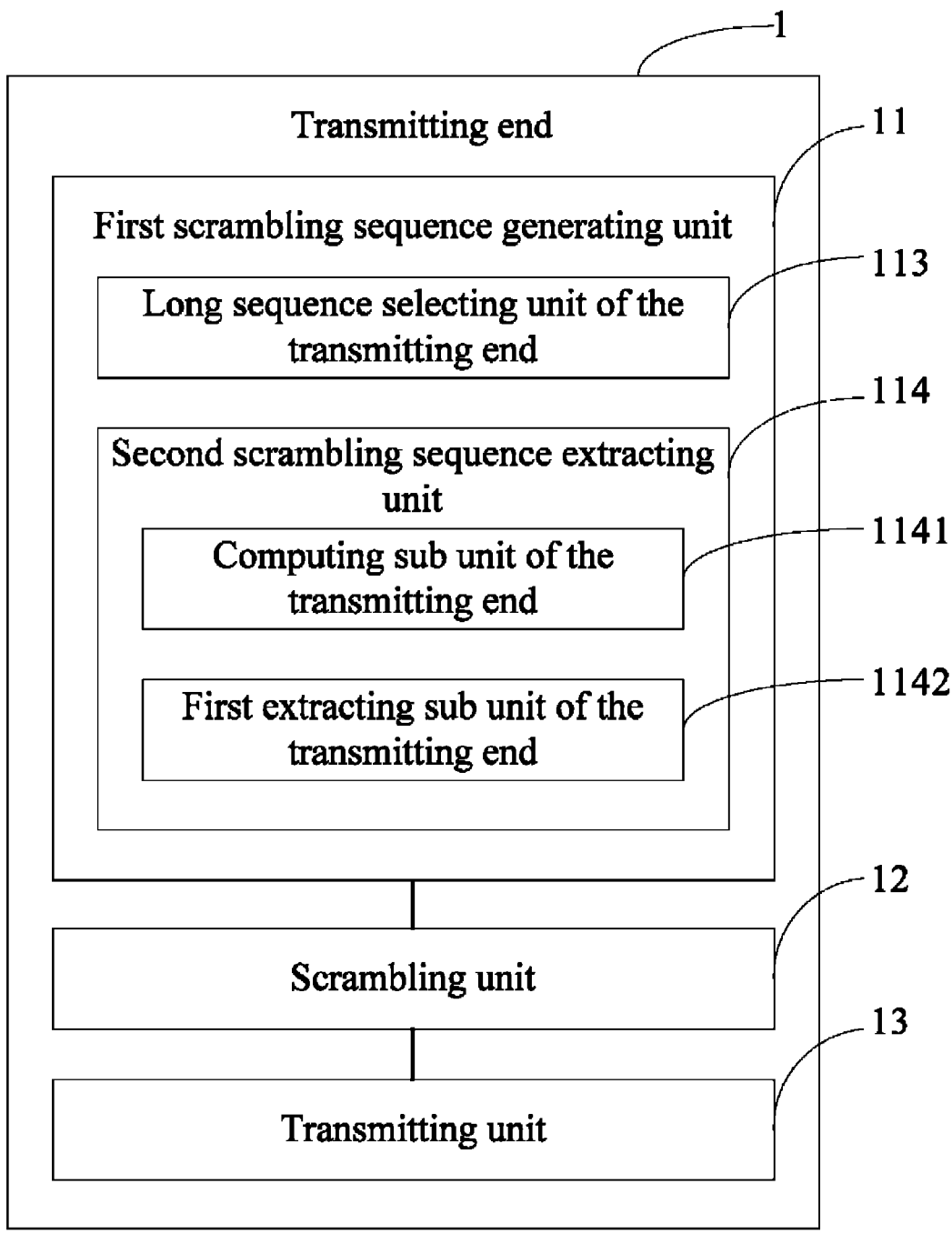
FIG. 9 is a fourth schematic structural diagram of a transmitting end according to an embodiment of the present application.

Further, as shown in FIG. 9, the second scrambling sequence extracting unit 114 may include:

a computing sub unit 1141 of the transmitting end, configured to obtain an start position of the scrambling sequence corresponding to the control channel element according to a control channel element that has extracted a scrambling sequence; and a first extracting sub unit 1142 of the transmitting end, configured to extract, starting from the start position, the scrambling sequence corresponding to the control channel element in the selected long sequence.

Figure 10:
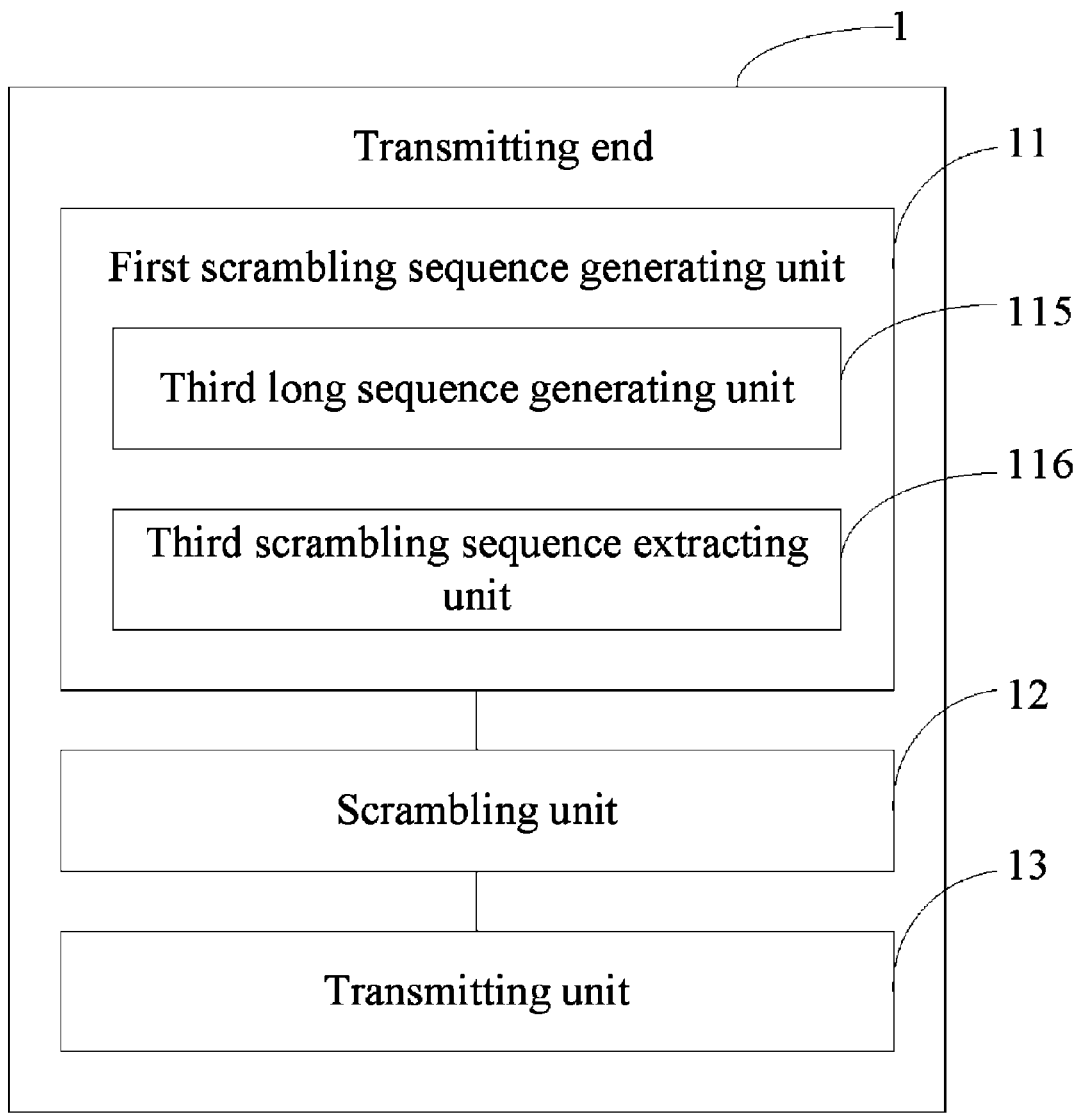
FIG. 10 is a fifth schematic structural diagram of a transmitting end according to an embodiment of the present application.

Or, as shown in FIG. 10, the first scrambling sequence generating unit 11 may include:
- a third long sequence generating unit 115, configured to generate a specific long sequence; and
- a third scrambling sequence extracting unit 116, configured to extract a sequence in the specific long sequence according to a specified length, and obtain a scrambling sequence corresponding to the control channel element according to the extracted sequence and a data length corresponding to the modulation mode used by the control channel element.

When data is received and sent by using an MIMO, the third scrambling sequence extracting unit 116 is further configured to extract a scrambling sequence corresponding to the control channel element according to the extracted sequence and a data length corresponding to the modulation mode used by the control channel element and a transmission mode of the MIMO.

Figure 11:
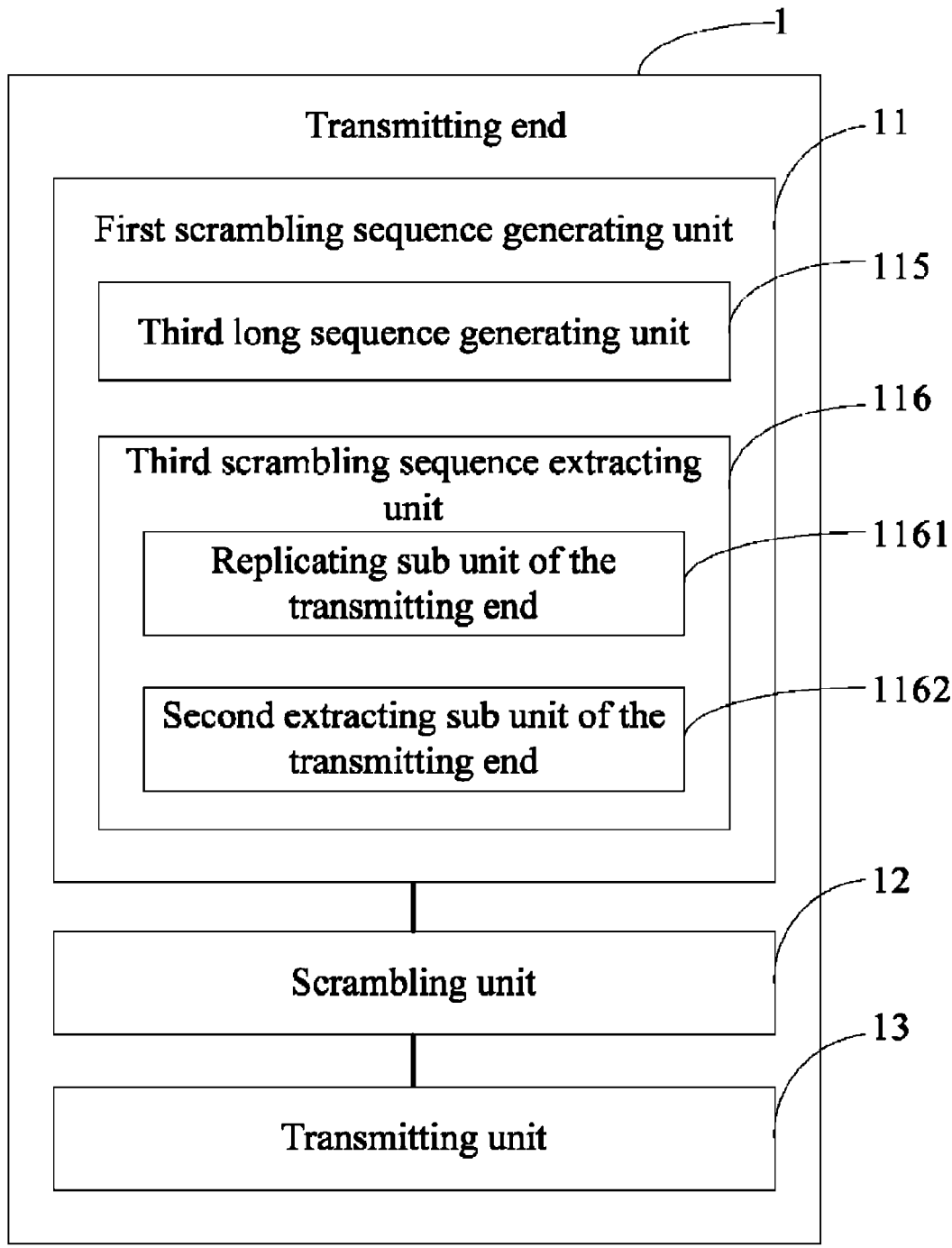
FIG. 11 is a sixth schematic structural diagram of a transmitting end according to an embodiment of the present application.

Further, as shown in FIG. 11, the third scrambling sequence extracting unit 116 may include:
- a replicating sub unit 1161 of the transmitting end, configured to: when a length of the extracted sequence is smaller than the data length corresponding to the modulation mode used by the control channel element, replicate the extracted sequence until a length of the replicated sequence is equal to the data length corresponding to the modulation mode used by the control channel element to obtain a scrambling sequence corresponding to the control channel element; and
- a second extracting sub unit 1162 of the transmitting end, configured to: when the length of the extracted sequence is greater than or equal to the data length corresponding to the modulation mode used by the control channel element, extract, in the extracted sequence, a sequence with a length equal to the data length corresponding to the modulation mode used by the control channel element to obtain a scrambling sequence corresponding to the control channel element.

When data is received and sent by using the MIMO, the replicating sub unit 1161 of the transmitting end is further configured to: when the length of the extracted sequence is smaller than the data length corresponding to the modulation mode used by the control channel element and the transmission mode of the MIMO, replicate the extracted sequence until a length of the replicated sequence is equal to the data length corresponding to the modulation mode used by the control channel element and the transmission mode of the MIMO to obtain a scrambling sequence corresponding to the control channel element; and
the second extracting sub unit 1162 of the transmitting end is further configured to: when the length of the extracted sequence is greater than or equal to the data length corresponding to the modulation mode used by the control channel element and the transmission mode of the MIMO, extract, in the extracted sequence, a sequence with a length equal to the data length corresponding to the modulation mode used by the control channel element and the transmission mode of the MIMO to obtain a scrambling sequence corresponding to the control channel element.

In this embodiment, the physical downlink control channel may be an ePDCCH, the control channel element may be an eCCE, and the transmitting end may be a base station.

The transmitting end provided by the embodiment of the present application, by generating a scrambling sequence according to an index number of a control channel element and/or a modulation mode used by the control channel element and a transmission mode of an MIMO, extracts a scrambling sequence in multiple modulation modes, so that scrambling and descrambling are performed on physical downlink control channel data in multiple modulation modes.

Embodiment 4

Figure 12:
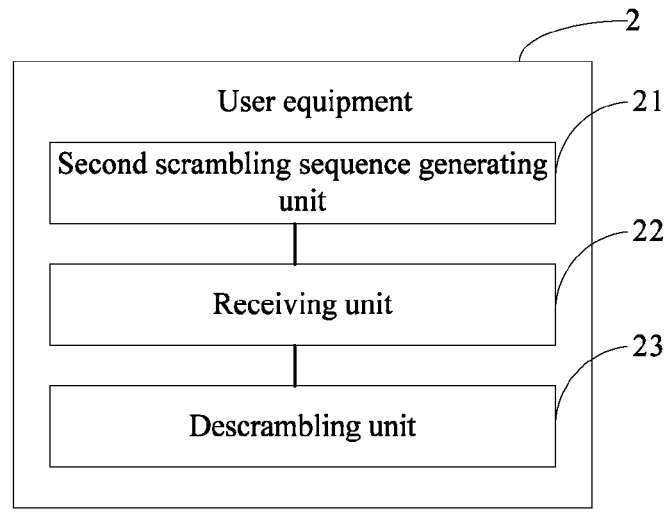
FIG. 12 is a first schematic structural diagram of a user equipment according to an embodiment of the present application.

As shown in FIG. 12, a user equipment 2 provided by an embodiment of the present application includes:
- a second scrambling sequence generating unit 21, configured to generate a scrambling sequence corresponding to a control channel element according to an index number of the control channel element and/or a modulation mode used by the control channel element;
- a receiving unit 22, configured to receive scrambled physical downlink control channel data from a transmitting end; and
- a descrambling unit 23, configured to perform descrambling on physical downlink control channel data by using the scrambling sequence.

Figure 13:
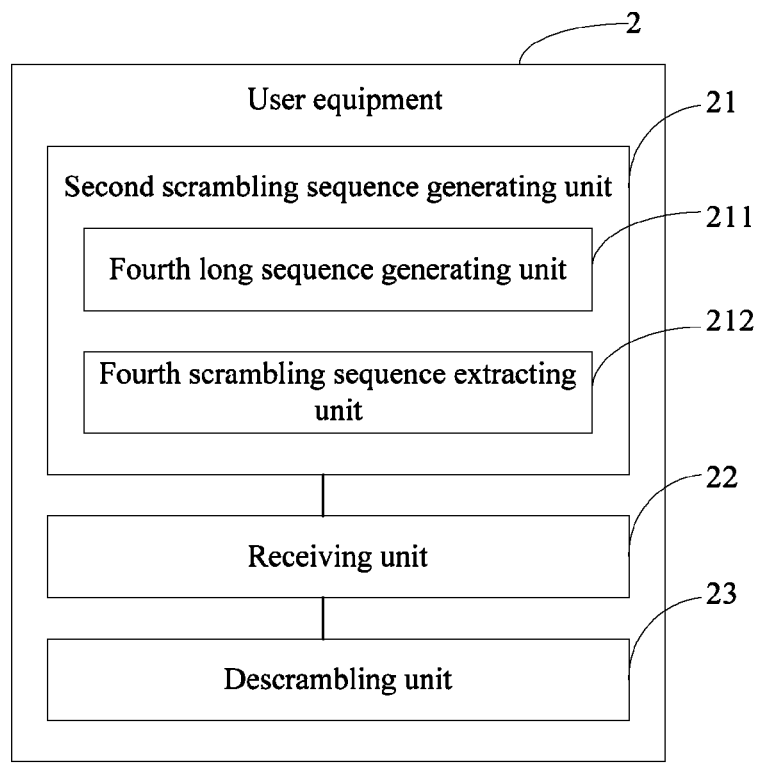
FIG. 13 is a second schematic structural diagram of a user equipment according to an embodiment of the present application.

Further, as shown in FIG. 13, the second scrambling sequence generating unit 21 may include:
- a fourth long sequence generating unit 211, configured to generate a specific long sequence according to a specific parameter of a user; and
- a fourth scrambling sequence extracting unit 212, configured to extract, according to a data length corresponding to the modulation mode used by the control channel element of the user equipment, a scrambling sequence corresponding to the control channel element in the specific long sequence.

When data is received and sent by using an MIMO, the fourth scrambling sequence extracting unit 211 is further configured to extract, according to a data length corresponding to the modulation mode used by the control channel element of the user equipment and a transmission mode of the MIMO, a scrambling sequence corresponding to the control channel element in the specific long sequence.

Figure 14:
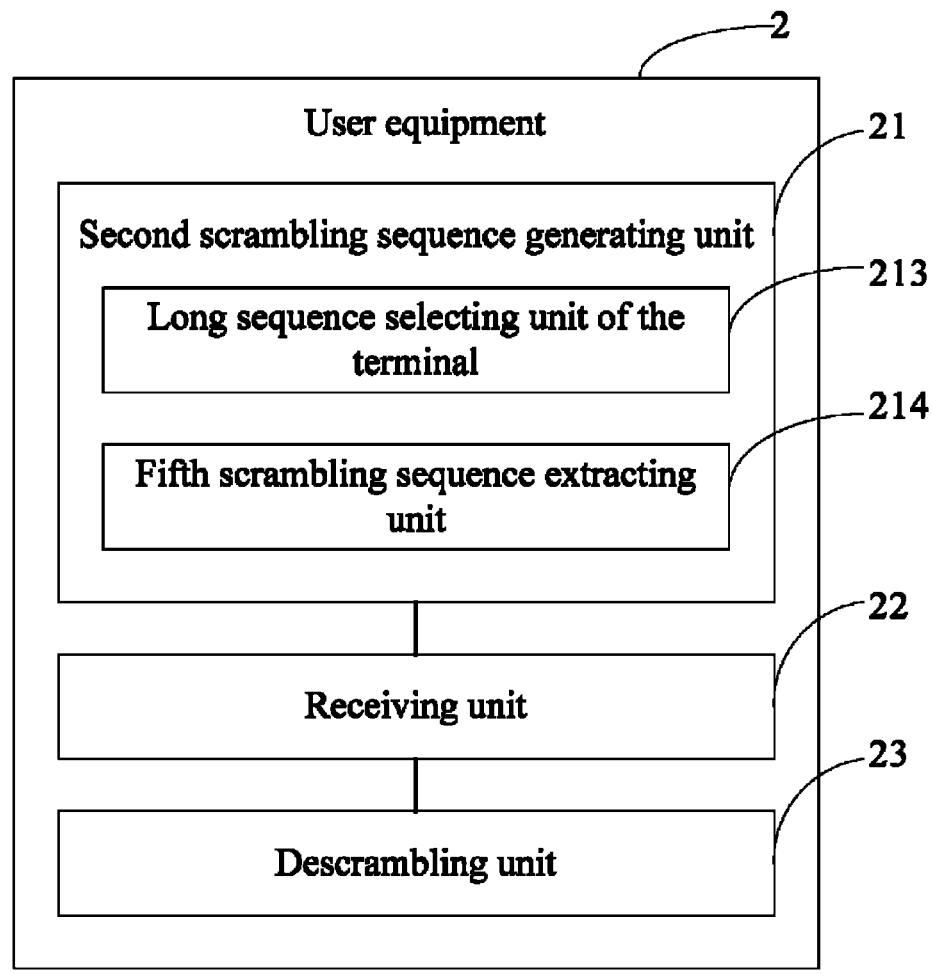
FIG. 14 is a third schematic structural diagram of a user equipment according to an embodiment of the present application.

Or, as shown in FIG. 14, the second scrambling sequence generating unit 21 may include:
- a long sequence selecting unit 213 of the terminal, configured to select a long sequence in a long sequence set according to physical downlink control channel parameters of the control channel element; and
- a fifth scrambling sequence extracting unit 214, configured to extract, according to a data length corresponding to the modulation mode used by the control channel element, a scrambling sequence corresponding to the control channel element in the selected long sequence.

When data is received and sent by using an MIMO, the fifth scrambling sequence extracting unit 214 is further configured to extract, according to a data length corresponding to the modulation mode used by the control channel element and a transmission mode of the MIMO, a scrambling sequence corresponding to the control channel element in the selected long sequence.

Figure 15:
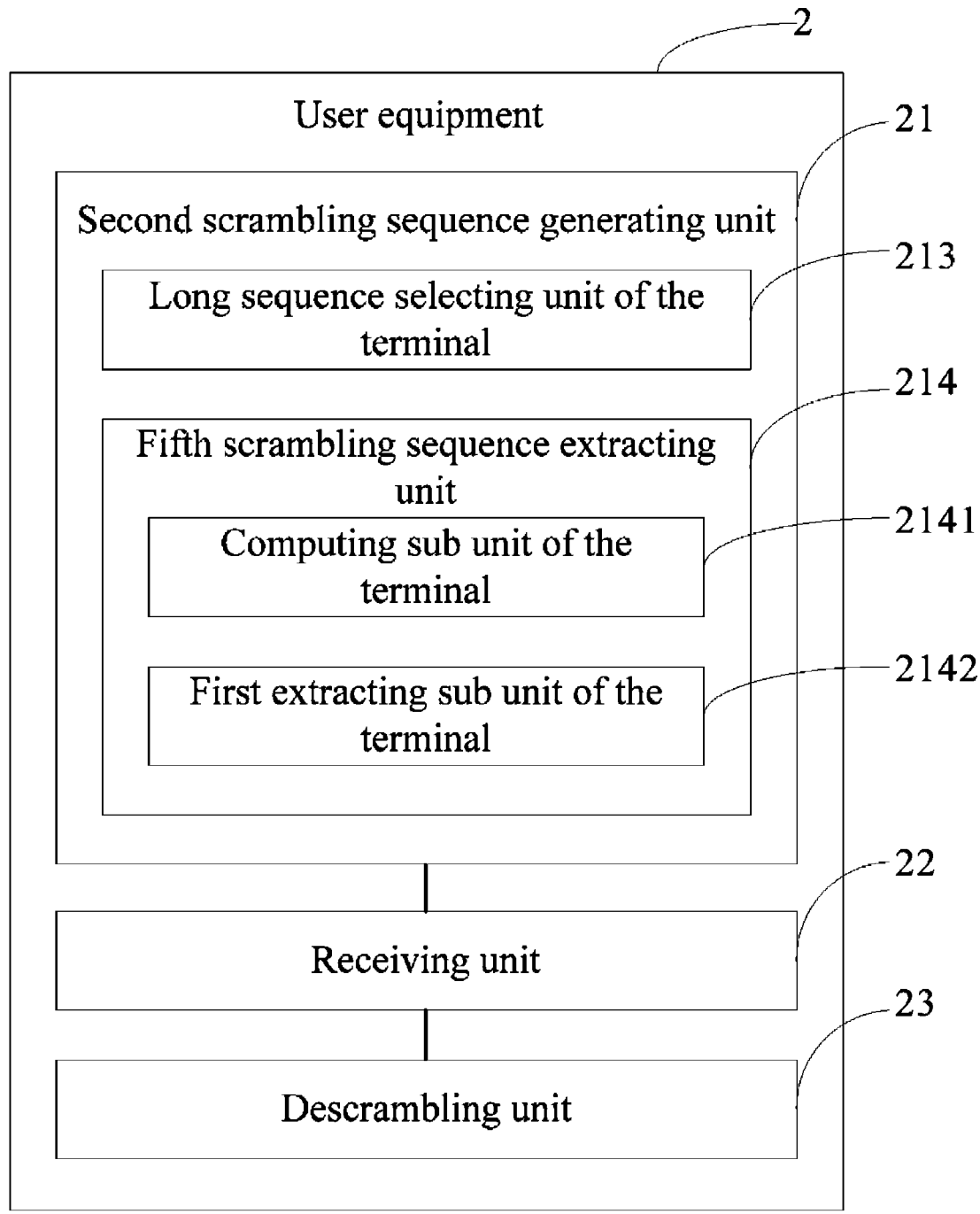
FIG. 15 is a fourth schematic structural diagram of a user equipment according to an embodiment of the present application.

Further, as shown in FIG. 15, the fifth scrambling sequence extracting unit 214 may include:
- a computing sub unit 2141 of the terminal, configured to obtain an start position of the scrambling sequence corresponding to the control channel element according to a control channel element that has extracted a scrambling sequence; and a first extracting sub unit 2142 of the terminal, configured to extract, starting from the start position, the scrambling sequence corresponding to the control channel element in the selected long sequence.

Figure 16:
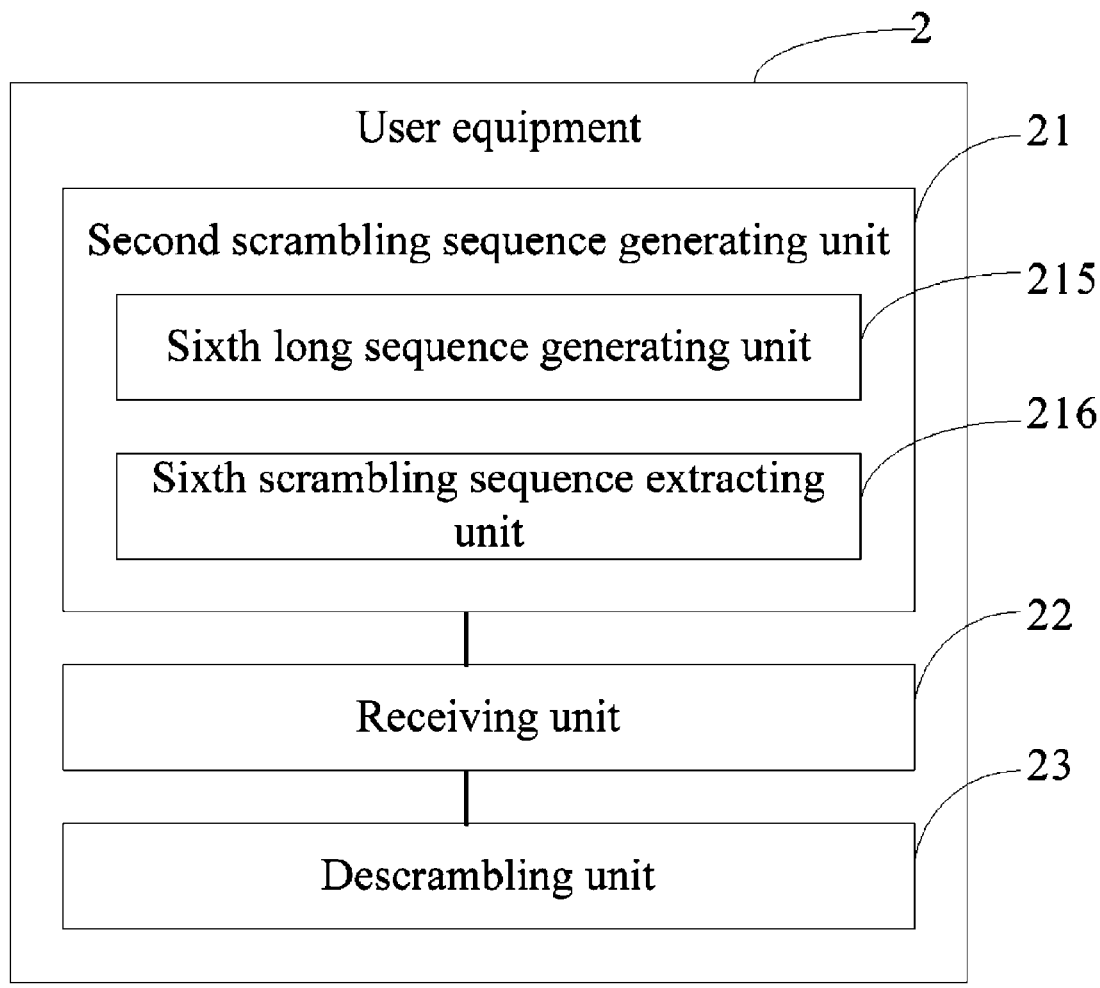
FIG. 16 is a fifth schematic structural diagram of a user equipment according to an embodiment of the present application.

Or, as shown in FIG. 16, the second scrambling sequence generating unit 21 may include:
 a sixth long sequence generating unit 215, configured to generate a specific long sequence; and
 a sixth scrambling sequence extracting unit 216, configured to extract a sequence in the specific long sequence according to a specified length, and obtain a scrambling sequence corresponding to the control channel element according to the extracted sequence and a data length corresponding to the modulation mode used by the control channel element.

When data is received and sent by using an MIMO, the sixth scrambling sequence extracting unit 216 is further configured to extract a scrambling sequence corresponding to the control channel element according to the extracted sequence and a data length corresponding to the modulation mode used by the control channel element and a transmission mode of the MIMO.

Figure 17:
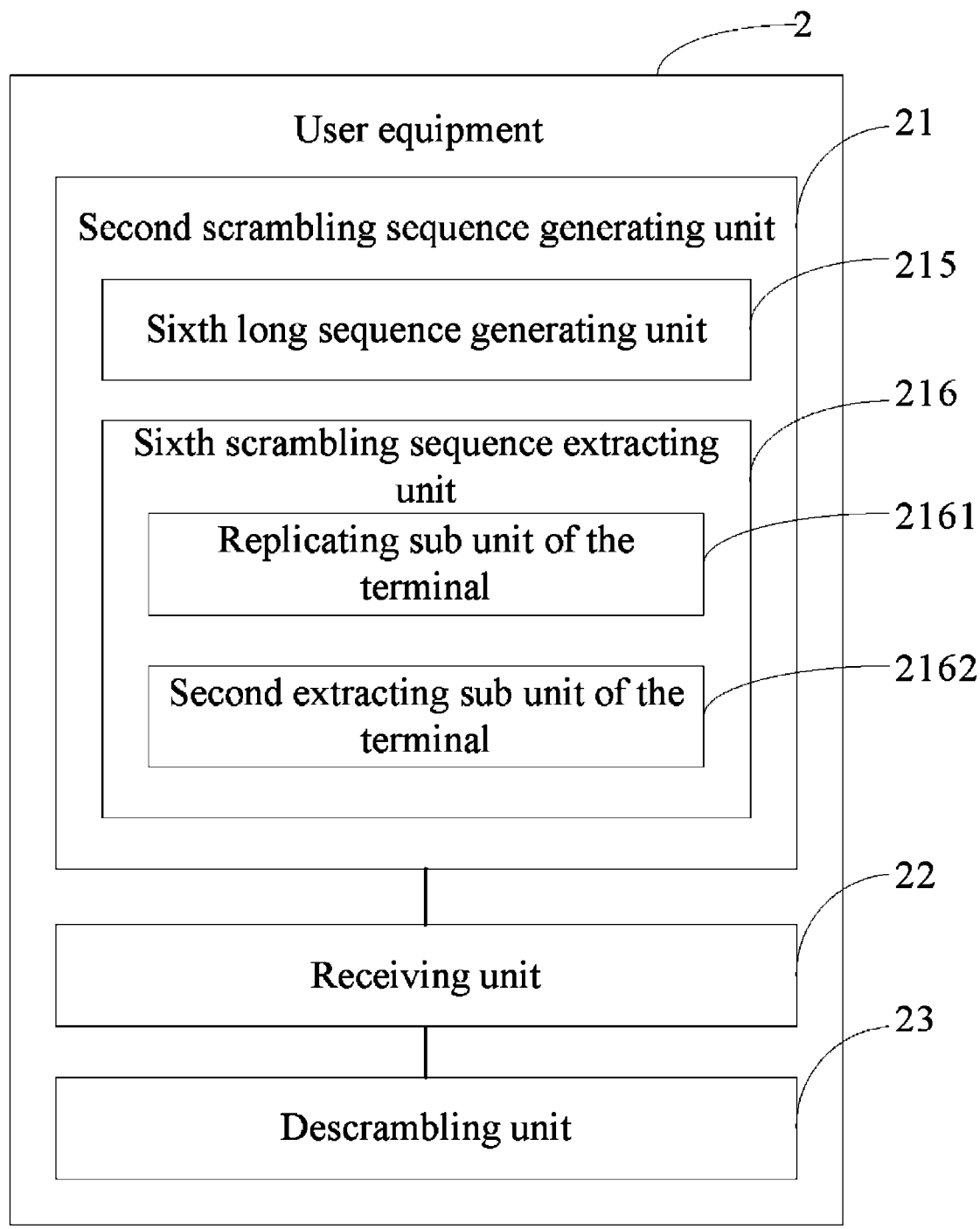
FIG. 17 is a sixth schematic structural diagram of a user equipment according to an embodiment of the present application.

Further, as shown in FIG. 17, the sixth scrambling sequence extracting unit 216 may include:
 a replicating sub unit 2161 of the terminal, configured to: when a length of the extracted sequence is smaller than the data length corresponding to the modulation mode used by the control channel element, replicate the extracted sequence until a length of the replicated sequence is equal to the data length corresponding to the modulation mode used by the control channel element to obtain a scrambling sequence corresponding to the control channel element; and
 a second extracting unit 2162 of the terminal, configured to: when the length of the extracted sequence is greater than or equal to the data length corresponding to the modulation mode used by the control channel element, extract, in the extracted sequence, a sequence with a length equal to the data length corresponding to the modulation mode used by the control channel element to obtain a scrambling sequence corresponding to the control channel element.

When data is received and sent by using an MIMO, the replicating sub unit 2161 of the terminal is further configured to: when the length of the extracted sequence is smaller than a data length corresponding to the modulation mode used by the control channel element and a transmission mode of the MIMO, replicate the extracted sequence until a length of the replicated sequence is equal to the data length corresponding to the modulation mode used by the control channel element and the transmission mode of the MIMO to obtain a scrambling sequence corresponding to the control channel element; and
 the second extracting sub unit 2162 of the terminal is further configured to: when the length of the extracted sequence is greater than or equal to the data length corresponding to the modulation mode used by the control channel element and the transmission mode of the MIMO, extract, in the extracted sequence, a sequence with a length equal to the data length corresponding to the modulation mode used by the control channel element and the transmission mode of the MIMO to obtain a scrambling sequence corresponding to the control channel element.

In this embodiment, the physical downlink control channel may be an ePDCCH, the control channel unit may be an eCCE, and the user equipment may be a handset.

The user equipment provided by the embodiment of the present application, by generating a scrambling sequence according to an index number of a control channel element and/or a modulation mode used by the control channel element and a transmission mode of an MIMO, extracts a scrambling sequence in multiple modulation modes, so that scrambling and descrambling are performed on physical downlink control channel data in multiple modulation modes.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:
1. An apparatus comprising:
 a processor; and
  a memory coupled to the processor, wherein the memory stores processor-executable instructions, which when executed causes the processor to implement operations including:
  generating a scrambling sequence corresponding to a control channel element according to an index number of the control channel element and/or a modulation mode used by the control channel element;
  performing scrambling on physical downlink control channel data by using the scrambling sequence; and
 wherein the apparatus further comprises a transmitter, configured to send the scrambled physical downlink control channel data to a user equipment,
 wherein generating the scrambling sequence corresponding to the control channel element according to the index number of the control channel element and/or the modulation mode used by the control channel element comprises:
 generating a specific long sequence for the user equipment according to a UE_Specific parameter; and
 extracting the scrambling sequence corresponding to the control channel element in the specific long sequence, wherein a length of the scrambling sequence corresponds to a data length corresponding to the modulation mode used by the control channel element of the user equipment.

2. The apparatus according to claim 1, wherein when data is received and sent by using multiple-input multiple-output (MIMO), the processor is further configured for extracting, according to a data length corresponding to the modulation mode used by the control channel element of the user equipment and a transmission mode of the MIMO, the scrambling sequence corresponding to the control channel element in the specific long sequence.

3. An apparatus comprising:
 a processor, and
 a memory coupled to the processor, wherein the memory stores processor-executable instructions, which when executed causes the processor to implement operations including:
 generating a scrambling sequence corresponding to a control channel element according to an index number of the control channel element and/or a modulation mode used by the control channel element; and performing descrambling on physical downlink control channel data from a transmitting end by using the scrambling sequence, wherein the generating the scrambling sequence comprises:

generating a specific long sequence according to a UE Specific parameter; and extracting the scrambling sequence corresponding to the control channel element in the specific long sequence, wherein a length of the scrambling sequence corresponds to a data length corresponding to the modulation mode used by the control channel element.

4. The apparatus according to claim 3, wherein when data is received and sent by using multiple-input multiple-output (MIMO), the processor is further configured for extracting, according to a data length corresponding to the modulation mode used by the control channel element and a transmission mode of the MIMO, the scrambling sequence corresponding to the control channel element in the specific long sequence.

5. A method performed by an apparatus and for processing physical downlink control channel data, comprising:

generating a scrambling sequence corresponding to a control channel element according to an index number of the control channel element and/or a modulation mode used by the control channel element;

performing scrambling on physical downlink control channel data by using the scrambling sequence according to a UE Specific parameter; and sending the scrambled physical downlink control channel data to a user equipment, wherein generating the scrambling sequence corresponding to the control channel element according to the index number of the control channel element and/or the modulation mode used by the control channel element comprises:

generating a specific long sequence for the user equipment according to a UE Specific parameter; and extracting the scrambling sequence corresponding to the control channel element in the specific long sequence, wherein a length of the scrambling sequence corresponds to a data length corresponding to the modulation mode used by the control channel element of the user equipment.

6. The method according to claim 5, wherein the generating a scrambling sequence corresponding to a control channel element according to an index number of the control channel element and/or a modulation mode used by the control channel element comprises:

selecting a long sequence in a long sequence set according to physical downlink control channel parameters of the control channel element; and extracting, according to a data length corresponding to the modulation mode used by the control channel element, the scrambling sequence corresponding to the control channel element in the selected long sequence.

7. The method according to claim 6, wherein when data is received and sent by using multiple-input multiple-output (MIMO), the extracting, according to a data length corresponding to the modulation mode used by the control channel element, a scrambling sequence corresponding to the control channel element in the selected long sequence comprises:

extracting, according to a data length corresponding to the modulation mode used by the control channel element and a transmission mode of the MIMO, the scrambling sequence corresponding to the control channel element in the selected long sequence.

8. The method according to claim 6, wherein the extracting a scrambling sequence corresponding to the control channel element in the selected long sequence comprises:

obtaining a start position of the scrambling sequence corresponding to the control channel element according to a control channel element that has extracted a scrambling sequence; and extracting, starting from the start position, the scrambling sequence corresponding to the control channel element in the selected long sequence.

9. The method according to claim 6, wherein different physical downlink control channel parameters correspond to different modulation modes.

10. A method performed by an apparatus and for processing physical downlink control channel data, comprising:

generating a scrambling sequence corresponding to a control channel element according to an index number of the control channel element and/or a modulation mode used by the control channel element; and performing descrambling on physical downlink control channel data from a transmitting end by using the scrambling sequence, wherein the generating the scrambling sequence comprises:

generating a specific long sequence according to a UE Specific parameter; and extracting, the scrambling sequence corresponding to the control channel element in the specific long sequence, wherein a length of the scrambling sequence corresponds to a data length corresponding to the modulation mode used by the control channel element.

11. The method according to claim 10, when data is received and sent by using multiple-input multiple-output (MIMO), the method further comprises: extracting, according to a data length corresponding to the modulation mode used by the control channel element and a transmission mode of the MIMO, the scrambling sequence corresponding to the control channel element in the specific long sequence.

* * * * *